(12) United States Patent
Chae et al.

(10) Patent No.: US 12,542,504 B2
(45) Date of Patent: Feb. 3, 2026

(54) DRIVING SYSTEM OF A DRIVING MOTOR

(71) Applicants: HYUNDAI MOTOR COMPANY, Seoul (KR); KIA CORPORATION, Seoul (KR)

(72) Inventors: Woong Chan Chae, Gwangmyeong-si (KR); Jung Shik Kim, Seoul (KR); Young Jin Shin, Changwon-si (KR); Byung Kwan Son, Suwon-si (KR); Tae Yong Lee, Seoul (KR); Sang Hoon Moon, Yongin-si (KR); Jong Hoon Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 901 days.

(21) Appl. No.: 17/842,541

(22) Filed: Jun. 16, 2022

(65) Prior Publication Data

US 2023/0052570 A1 Feb. 16, 2023

(30) Foreign Application Priority Data

Aug. 11, 2021 (KR) .................. KR10-2021-0105769

(51) Int. Cl.
*H02P 25/18* (2006.01)
*H02K 3/12* (2006.01)
(Continued)

(52) U.S. Cl.
CPC .............. *H02P 25/18* (2013.01); *H02K 3/28* (2013.01); *H02K 11/33* (2016.01); *H02K 17/14* (2013.01); *H02P 29/50* (2016.02); *H02K 3/12* (2013.01)

(58) Field of Classification Search
CPC ...... H02K 3/28; H02K 11/33; H02P 23/0086; H02P 25/18; H02P 29/50; H02P 27/06; Y02T 10/64
See application file for complete search history.

(56) References Cited

U.S. PATENT DOCUMENTS 3,678,352 A * 7/1972 Bedford ................. H02K 29/06
318/400.41
4,160,938 A * 7/1979 Akamatsu ............. H02P 25/024
318/722

(Continued)

FOREIGN PATENT DOCUMENTS

| JP | 2018011490 A | 1/2018 |
|---|---|---|
| KR | 20160032354 A | 3/2016 |

*Primary Examiner* — Pedro J Cuevas
(74) *Attorney, Agent, or Firm* — Lempia Summerfield Katz LLC

(57) ABSTRACT

A driving system of a driving motor is proposed. The system includes: a stator having slots at which coils are wound; a first inverter connected to first ends of the coils of the stator; a second inverter connected to second ends of the coils of the stator; and a stage switch circuit configured to control an electrical connection between the second ends of the coils of the stator and the second inverter. In particular, the coils include a first coil set connected to an output terminal of the first inverter, and a second coil set connected to an input terminal of the second inverter. Currents having the same phase or currents having different AC phases are applied to the first coil set and the second coil set wound at the slots by controlling on and off of the stage switch circuit.

13 Claims, 8 Drawing Sheets

(51) Int. Cl.
  *H02K 3/28*   (2006.01)
  *H02K 11/33*  (2016.01)
  *H02K 17/14*  (2006.01)
  *H02P 29/50*  (2016.01)

(56) References Cited

U.S. PATENT DOCUMENTS

| | | | | |
|---|---|---|---|---|
| 4,743,828 A * | 5/1988 | Jahns | ............... | B63H 21/17 |
| | | | | 363/43 |
| 4,994,725 A * | 2/1991 | Gschlossl | ............. | H02P 3/04 |
| | | | | 318/808 |
| 7,439,697 B2 * | 10/2008 | Miyazaki | ............. | H02P 25/18 |
| | | | | 318/400.41 |
| 8,138,697 B2 * | 3/2012 | Palma | ............. | H02P 21/0089 |
| | | | | 318/696 |
| 9,209,704 B2 * | 12/2015 | Huang | ............. | H02P 27/00 |
| 10,644,621 B2 | 5/2020 | Kimura et al. | | |
| 11,190,124 B2 * | 11/2021 | Ghaderi | ............. | H02M 1/32 |
| 11,196,315 B2 * | 12/2021 | Kinjo | ............. | H02P 25/22 |
| 11,824,414 B2 * | 11/2023 | Chae | ............. | H02M 7/537 |
| 11,942,887 B2 * | 3/2024 | Faedo | ............. | H02P 27/08 |
| 11,967,862 B2 * | 4/2024 | Chae | ............. | H02K 3/16 |
| 2007/0120520 A1 * | 5/2007 | Miyazaki | ............. | B60L 15/025 |
| | | | | 318/801 |
| 2007/0151272 A1 * | 7/2007 | Cosan | ............. | F25B 49/025 |
| | | | | 62/228.1 |
| 2008/0265817 A1 * | 10/2008 | Palma | ............. | H02P 21/0089 |
| | | | | 318/400.35 |
| 2019/0238073 A1 | 8/2019 | Kimura et al. | | |
| 2020/0186074 A1 * | 6/2020 | Ghaderi | ............. | H02M 1/32 |
| 2022/0158514 A1 * | 5/2022 | Chae | ............. | H02M 7/53871 |
| 2022/0385121 A1 * | 12/2022 | Chae | ............. | H02K 11/30 |
| 2023/0179137 A1 * | 6/2023 | Faedo | ............. | H02P 27/08 |
| | | | | 318/490 |
| 2024/0388218 A1 * | 11/2024 | Zhang | ............. | H02M 7/521 |
| 2024/0424930 A1 * | 12/2024 | Lee | ............. | B60L 58/20 |

* cited by examiner

DRIVING SYSTEM OF A DRIVING MOTOR

CROSS REFERENCE TO RELATED APPLICATION

The present application claims priority to and the benefit of Korean Patent Application No. 10-2021-0105769, filed Aug. 11, 2021, the entire contents of which are incorporated herein by reference.

BACKGROUND

Field

The present disclosure relates to a driving system of a driving motor, the driving system being able to operate the winding pattern of the driving motor based on the mode of a vehicle.

Description of the Related Art

The statements in this section merely provide background information related to the present disclosure and do not necessarily constitute prior art.

As a driving motor for electric vehicles (EV) is developed, the demand for high-performance vehicles is increasing. In order to correspond to the driving motor desired for high-performance vehicles, the driving system of the motor is also desired to provide an ability to outperform high torque, high output, and high speed. In general, the maximum efficiency point of a driving system of a high-performance motor follows the maximum output line. On the contrary, since the range (fuel efficiency mode) in which vehicles are usually driven requires a load torque, there is a problem that as a technology suitable for the driving system of a high-performance motor is developed, it is difficult to correspond to high-efficiency design of the driving motor. In order to solve this problem, a 2-stage driving system that can selectively connect either of two inverters to a motor is being developed.

In the motor driving system that uses two inverters, it is possible to further improve the output efficiency of the inverters and the motor by applying a voltage to the motor by controlling the two inverters. However, we have discovered that when the winding pattern of a stator coil of the related art is applied to the driving system to which two inverters are applied, a current path is generated by a common mode (harmonic wave) voltage, so generation of a common mode current becomes a problem. As a result, when the generated common mode current is not offset, it causes the problem that the NVH (noise, vibration, harshness) get worse and a loss is increased in the driving motor.

We have also found that in a circuit structure in which two inverters are combined with a driving motor, the output of the driving motor increases but the efficiency of the driving motor decreases. In another circuit structure in which one inverter is combined with a driving motor, the efficiency of the driving motor increases but the output of the driving motor decreases. In addition, when the winding pattern of coils is fixed to one pattern, the output and the efficiency of a driving motor cannot be simultaneously increased.

SUMMARY

The present disclosure provides a driving system of a driving motor, and the driving system is able to operate the winding pattern of the driving motor in a full pitch winding mode or a short pitch winding mode, depending on the mode of a vehicle.

In one form of the present disclosure, a driving system of a driving motor increases both of the efficiency and the output of the driving motor.

In an exemplary form of the present disclosure, a driving system of a driving motor includes: a driving motor including a stator having slots at which coils, to which currents of three phases are applied, are wound; a first inverter connected to first ends of the coils of the stator; a second inverter connected to second ends of the coils of the stator; and a stage switch circuit configured to control an electric connection between the second ends of the coils of the stator and the second inverter, in which the coils include a first coil set connected to an output terminal of the first inverter and a second coil set connected to an input terminal of the second inverter, and currents having the same phase or currents having different AC phases are applied to the first coil set and the second coil set wound at the slots by controlling on/off of the stage switch circuit.

According to an embodiment, when the stage switch circuit is turned off, currents having the same phase may be applied to the first coil set and the second coil set wound at the slots.

According to an embodiment, when the stage switch circuit is turned on, currents having different AC phases are applied to the first coil set and the second coil set wound at the slots.

According to an embodiment, two or three slots which are adjacent each other are defined as a pair of slots, the second coil set of the pair of slots may be defined as fundamental part, and the first coil set of another pair of slots adjacent to the pair of slots may be defined as a short-pitch part of the fundamental part.

According to an embodiment, the fundamental part and the short-pitch part may be coils to which currents having the same phase are applied, the current that is applied to the short-pitch part may have a phase difference by 60 degrees from the current that is applied to the fundamental part, and harmonic waves generated by the short-pitch part may be offset with harmonic waves generated by the fundamental part.

According to an embodiment, first power conversion devices and second power conversion devices may be provided between the first coil set and the second coil set, and third power conversion devices and fourth power conversion devices may be provided between the second coil set and the second inverter.

According to an embodiment, the first power conversion devices and the second power conversion devices may have different on/off time points, and the third power conversion devices and the fourth power conversion devices may have different on/off time points.

According to an embodiment, a first end of the second coil set may be connected to the first power conversion devices and the fourth power conversion devices, and a second end of the second coil set may be connected to the second power conversion devices and the third power conversion devices.

According to an embodiment, when the stage switch circuit is turned off, the first power conversion devices and the third power conversion devices may be turned on, the second power conversion devices and the fourth power conversion devices may be turned off, and the first coil set and the second coil set may be connected to each other by the first power conversion devices.

According to an embodiment, when the stage switch circuit is turned on, the first power conversion devices and the third power conversion devices may be turned off, the second power conversion devices and the fourth power conversion devices may be turned on, and the first coil set and the second coil set may be connected to each other by the second power conversion devices.

According to an embodiment, the first coil set and the second coil set may be connected to each other by the fourth power conversion devices.

According to an embodiment, the first coil set may be disposed outside the slots and the second coil set may be disposed inside the slots.

According to an embodiment, 48 or 72 slots may be provided for eight electrodes.

According to an embodiment of the present disclosure, it is possible to control the phase voltage of the driving motor by controlling the stage switch circuit in accordance with the driving mode of a vehicle, and accordingly, the circuit of the driving system of a driving motor can be changed to be suitable for the driving mode of the vehicle. That is, the driving system of a driving motor according to an embodiment of the present disclosure can change a mode into the 2-distribution short-pitch winding mode and the 2-distribution full-pitch winding mode, so it is possible to both improve the output of the driving motor and maintain the efficiency of the driving motor in accordance with the driving mode of a vehicle.

According to an embodiment of the present disclosure, when a driving motor is driven in the short-pitch winding mode, the output of the driving motor can be increased, and when a driving motor is driven in the full-pitch winding mode, the efficiency of the driving motor can be increased.

Further areas of applicability will become apparent from the description provided herein. Everyone should understand that the description and specific examples presented herein are for the purpose of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which:

FIG. 5B is a diagram illustrating a circuit connection structure when a stage switch circuit according to an embodiment of the present disclosure is turned on.

Figure 1:
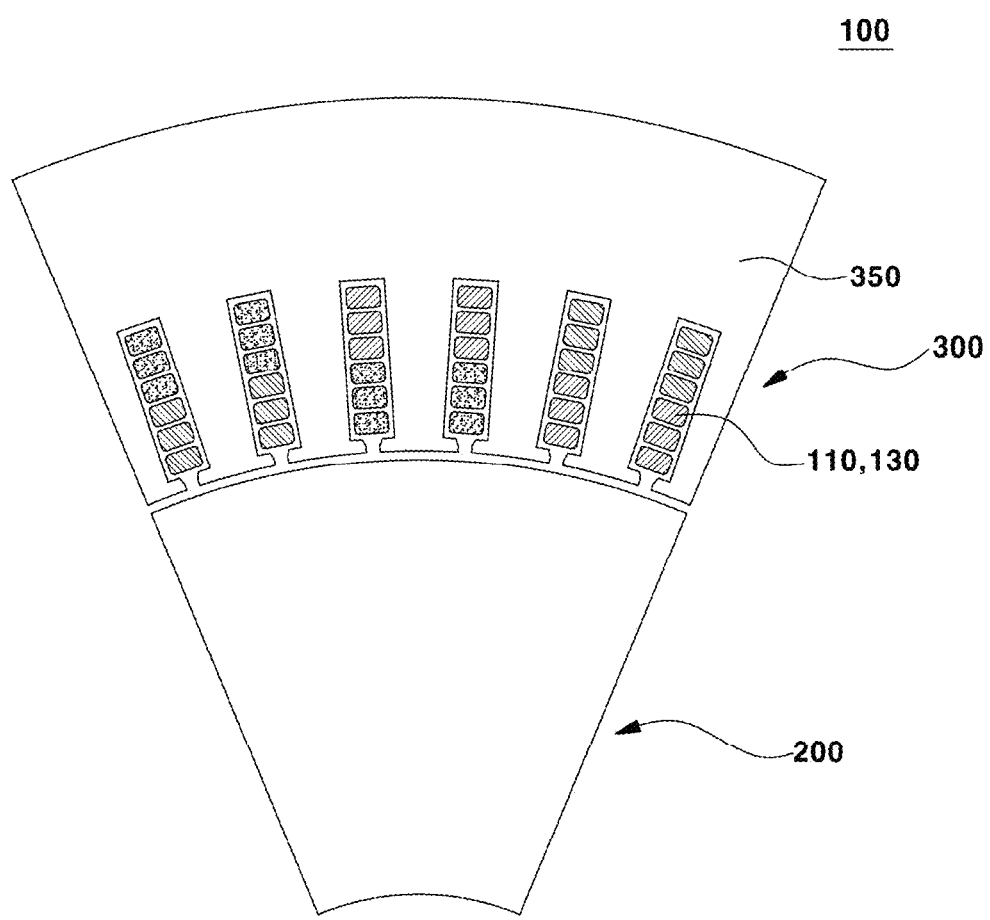
FIG. 1 is a diagram showing a portion of a driving motor according to an embodiment of the present disclosure.

The drawings described herein are for illustration purposes only and are not intended to limit the scope of the present disclosure in any way.

DETAILED DESCRIPTION

The advantages and features of the present disclosure, and methods of achieving them should be clear by referring to the exemplary embodiments that are describe below in detail with reference to the accompanying drawings. However, the present disclosure is not limited to the exemplary embodiments described hereafter and may be implemented in various ways, and the exemplary embodiments are provided to complete the description of the present disclosure and let those having ordinary skill in the art completely know the scope of the present disclosure and the present disclosure is defined by claims. Like reference numerals indicate like components throughout the specification.

Some components are given terms 'first', 'second', etc. for discrimination throughout the specification because they have the same names, but they are not necessarily limited to the order in the following description.

The specification provides examples of the present disclosure. Further, the description provides an embodiment of the present disclosure and the present disclosure may be used in other various combination and environments. That is, the present disclosure may be changed or modified within the scope of the present disclosure described herein, a range equivalent to the description, and/or within the knowledge or technology in the related art. The embodiment shows an optimum state for achieving the spirit of the present disclosure and may be changed in various ways for the detailed application fields and use of the present disclosure. Therefore, the detailed description of the present disclosure is not intended to limit the present disclosure in the embodiment. Further, the claims should be construed as including other embodiments.

FIG. 1 is a diagram showing a portion of a motor according to an embodiment of the present disclosure.

Referring to FIG. 1, a driving motor 100 may include a rotor 200 and a stator 300. The rotor 200 may include a plurality of permanent magnets (not shown). The stator 300 may be disposed with a predetermined gap from the rotor 200. The stator may Include a stator core 350 formed by stacking a plurality of thin steel plates, and coils 110 and 130 wound at slots defined in the stator core 350. A 3-phase current may be applied to the coils 110 and 130. The pattern of the coils 110 and 130 wound at the slots (defined in the stator 300 may be defined as a winding pattern. The coils 110 and 130 may be connected to inverters included in a driving system of a driving motor to be described below. A magnetic field is generated by the current applied to the coils 110 and 130 of the stator 300 and the permanent magnets (not shown) that are one of the components of the rotor 200 generate a rotational force through electromagnetic interaction, whereby the rotor 200 can be rotated. As the rotor 200 is rotated, the driving motor 100 can generate torque from the rotational force.

Figure 2:
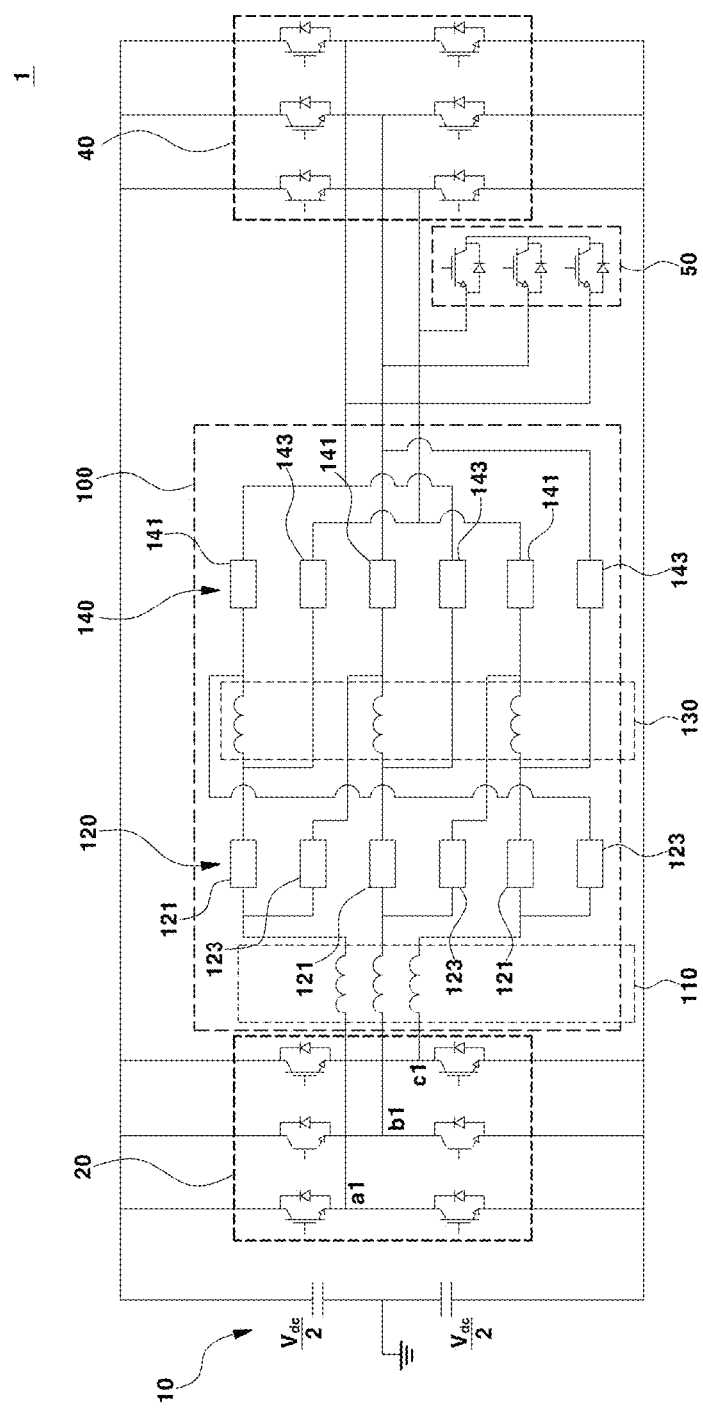
FIG. 2 is a circuit diagram showing a driving system of a driving motor according to an embodiment of the present disclosure.

FIG. 2 is a circuit diagram showing a driving system of a driving motor according to an embodiment of the present disclosure.

Referring to FIG. 2, a driving system 1 of a driving motor may be configured by a circuit that can be driven in two stages, depending on the driving mode of a vehicle. For example, the driving system 1 of a driving motor may be driven with one AC driving motor 1000 and two inverters 20 and 40 connected to each other (Open end winding: OEW).

As another example, the driving system 1 of a driving motor may be driven with one driving motor 10 and one inverter 20 connected to each other (Close end winding: CEW). For example, the driving system 1 of a driving motor can be operated in the OEW mode when the driving mode of a vehicle is a high-power mode, and the driving system 1 of a driving motor can be operated in the CEW mode when the driving mode of a vehicle is a fuel economy mode.

In one form, the driving system 1 of a driving motor may include a battery 10, a first inverter 20, a driving motor 100, a second inverter 40, and a stage switch circuit 50.

The battery 10 may be an energy storage device that supplied power for driving a motor in an eco-friendly vehicle equipped with a driving motor 100 that generates power for rotating wheels such as an electric vehicle or a plug-in hybrid vehicle. When the battery 10 is applied to an eco-friendly vehicle, the battery 10 is discharged when the driving motor 100 is driven, and can be charged with power from an external system.

The inverters 20 and 40 may be bidirectional inverters that selectively operate to convert and output the DC current of the battery 10 into a plurality of items of AC power having different phases or to convert and output a plurality of items of AC power to the battery 10. The driving or regenerative braking of the driving motor 100 is possible by 6 switching elements included in each of the inverters 20 and 40.

The first inverter 20 may have a power input terminal connected to the battery 10 and first input/output terminals a1, b1, and c1 connected to the driving motor 100. When the driving motor 100 is driven, the first inverter 20 can be provided with power from the battery 10 at the power input terminal, can convert the power into AC power having a plurality of phases using the switching elements, and can output the AC power to the first input/output terminals a1, b1, and c1, respectively. Since a technology of driving the driving motor 100 using 3-phase power having a phase difference of 120 degrees is usually applied, several embodiments of the present disclosure are described on the basis of inverters 20 and 40 that perform 3-phase power conversion and a 3-phase driving motor 100.

The driving motor 100 can be driven by the 3-phase AC power converted by the inverters 20 and 40. The driving motor 100 may include a plurality of stator coils 110 and 130 that receive a plurality of items of AC power having different phases from the first inverter 20. The stator coils 110 and 130 may be classified into a first coil set 110 and a second coil set 130. The driving motor 100 may include front power conversion devices 120 that adjust the path of the current applied to the first coil set 110 and rear power conversion devices 140 that adjust the path of the current applied to the second coil set 130. For example, six front power conversion devices 120 and six rear power conversion devices 140 may be provided. The front power conversion devices 120 may be provided between the first coil set 110 and the second coil set 130 and the rear power conversion devices 140 may be provided between the second coil set 130 and the second inverter 40. For example, front power conversion devices 120 and the rear power conversion devices 140 may be power semiconductor switches or Thyristor-based switches. However, the kind of the front power conversion devices 120 and the rear power conversion devices 140 may not be limited to the example described above.

The front power conversion devices 120 may include first power conversion devices 121 and second power conversion devices 123 having different on/off time points. The rear power conversion devices 140 may include third power conversion devices 141 and fourth power conversion devices 143 having different on/off time points. The first power conversion devices 121 and the third power conversion devices 141 may have the same on/off time point, and the second power conversion devices 123 and the fourth power conversion devices 143 may have the same on/off time point.

The first coil set 110 may be connected to the first inverter 20 at the first input/output terminals a1, b1, and c1. In other words, a first end of the first coil set 110 may be connected to the output terminal of the first inverter 20. The first coil set 110 may include a first coil 111, a second coil 112, and a third coil 113 that are inserted in different slots and to which currents having different phases are applied. For example, a U-phase current may be applied to the first coil 111, a W-phase current may be applied to the second coil 112, and a V-phase current may be applied to the third coil 113. However, the AC phases of the currents that are applied to the first coil 111, the second coil 112, and the third coil 113 may be changed. A second end of the first coil set 110 may be connected to the first power conversion devices 121 and the second power conversion devices 123. The first coil 111 may be connected to one first power conversion device 121 and one second power conversion device 123. The second coil 112 may be connected to one first power conversion device 121 and one second power conversion device 123. The third coil 113 may be connected to one first power conversion device 121 and one second power conversion device 123. When any ones of the first power conversion devices 121 and the second power conversion devices are turned on, the first coil set 110 can be connected to the second coil set 130 through the turned-on power conversion devices.

The first end of the second coil set 130 may be connected to the first power conversion devices 121 and the fourth power conversion devices 143, and the second end of the second coil set 130 may be connected to the second power conversion devices 123 and the third power conversion devices 141. The second coil set 130 may include a fourth coil 131, a fifth coil 132, and a fourth coil 133 that are inserted in different slots and to which currents having different phases are applied. The fourth coil 131 may be wound at the same slot as the first coil 111. The fifth coil 132 may be wound at the same slot (not shown) as the second coil 112. The sixth coil 133 may be wound at the same slot as the third coil 113. The fourth coil 131 may be connected to one third power conversion device 141 and one fourth power conversion device 143. The fourth coil 132 may be connected to one third power conversion device 141 and one fourth power conversion device 143. The sixth coil 133 may be connected to one third power conversion device 141 and one fourth power conversion device 143.

For example, the pattern of the first coil set 110 and the second coil set 130 wound at slots or the AC phases that are applied to the first coil set 110 and the second coil set 130 may be changed by on/off of the front power conversion devices 120 and the rear power conversion devices 140. In one form, the connection structure between the first coil set 110 and the second coil set 130 may be changed by on/off of the front power conversion devices 120 and the rear power conversion devices 140. When the connection structure between the first coil set 110 and the second coil set 130 is changed, the currents that are applied to coils wound at one slot may have the same phase or two phases.

The second inverter 40 may have second input/output terminals a2, b2, and c2 connected to the driving motor 100. The second inverter 40 can control the reactive power of the driving motor 100. The second inverter 40 compensates for the reactive power component desired for the first inverter 20, whereby the first inverter 20 can expand the constant power period according to voltage limitation in high-speed driving (a high-power mode of a vehicle).

The stage switch circuit 40 may be connected to the second input/output terminals a2, b2, and c2 where the second inverter 40 and the driving motor 100 are connected to each other. The stage switch circuit 50 can control the connection between the driving motor 100 and the second inverter 40, depending on the driving mode of a vehicle. In detail, the stage switch circuit 50 may connect the driving motor 100 and the second inverter 40 to each other when the driving mode of a vehicle is a high-power mode, and may not connect the driving motor 100 and the second inverter 40 to each other when the driving mode of a vehicle is a fuel economy mode.

For example, when one driving motor 100 and two inverters 20 and 40 are connected to each other (the stage switch circuit 50 is turned on), the phase voltage of the driving motor 100 may be the same as the DC voltage of the battery 10. Accordingly, when one driving motor 100 and two inverters 20 and 40 are connected to each other, it may be suitable for a high-power mode of a vehicle.

As another example, when one driving motor 100 and one inverter 20 are connected to each other (the stage switch circuit 50 is turned off), the phase voltage of the driving motor 100 may be smaller than the DC voltage of the battery 10. Accordingly, when one driving motor 100 and one inverter 20 are connected to each other, it may be suitable for a fuel economy mode, as compared with when one driving motor 100 and two inverters 20 and 40 are connected to each other.

According to an embodiment of the present disclosure, it is possible to control the phase voltage of the driving motor 100 by controlling the stage switch circuit 50 in accordance with the driving mode of a vehicle, and accordingly, the circuit of the driving system 1 of a driving motor can be changed to be suitable for the driving mode of the vehicle. As a result, the efficiency of the driving motor 100 can be increased in each of the high-power mode and the fuel economy mode.

Figure 3:
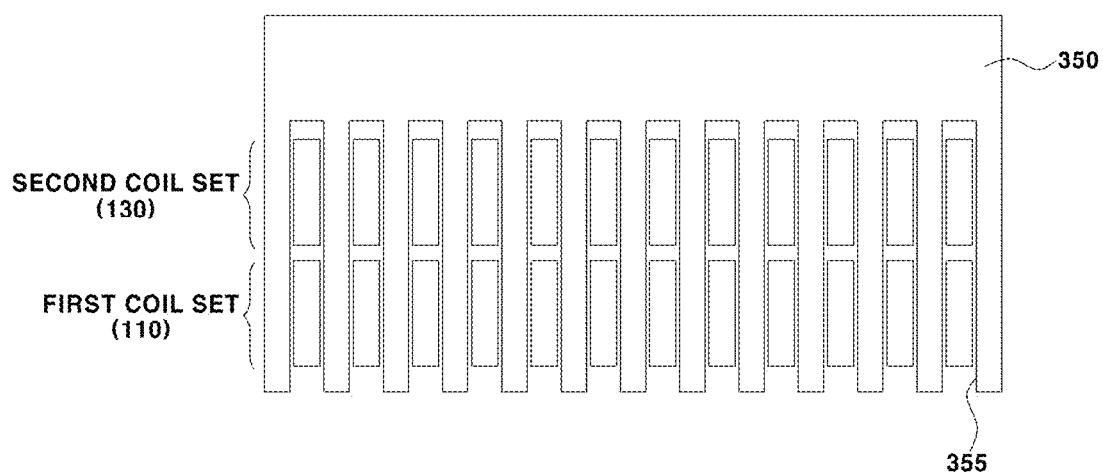
FIG. 3 is a diagram showing a winding pattern of a driving motor according to an embodiment of the present disclosure.

FIG. 3 is a diagram showing a winding pattern of a driving motor according to an embodiment of the present disclosure.

Referring to FIGS. 2 and 3, a plurality of slots 355 may be defined at the stator core 350. For example, 48 or 72 slots 355 may be provided for eight electrodes.

The coils 110 and 130 may be wound at each of the slots 355 The first coil sets 110 may be disposed outside the slots 355 and the second coil set 130 may be disposed inside the slots 355. The outside of the slots 355 may be the region close to the rotary shaft of the driving motor 100 in comparison to the inside of the slots 355. That is, the direction from the inside to the outside of the slots may be the direction going to the rotary shaft of the driving motor 100.

The phase of the current that is applied to the first coil set 110 and the second coil set 130 may be changed by on/off of the stage switch circuit 50, the front power conversion devices 120, and the rear power conversion devices 140. When the phase of the current that is applied to the first coil set 110 and the second coil set 130 is changed, the first coil set 110 and the second coil set 130 may receive a current like they are wound at the slots 355 in a 2-distribution full-pitch winding or a 2-distribution short-pitch winding. In an embodiment of the present disclosure, it is defined that the driving motor 100 operates in a 2-distribution short-pitch winding mode when currents having different phases are applied to the coils 110 and 130 wound at one slot 355, and it is defined that the driving motor 100 operates in a 2-distribution short-pitch winding mode when a current of one phase is applied to the coils 110 and 130 wound at one slot 355.

For example, when the stage switch circuit 50 is turned on and the driving system 1 of a driving motor operates in the OEW mode, the second power conversion devices 123 and the fourth power conversion devices 143 can be turned on. In this case, the first power conversion devices 121 and the third power conversion devices 141 can be turned off. The first coil 111 and the fourth coil 131 inserted in the same slot 355 are not directly connected to each other, so currents having different phases can be applied to the first coil 111 and the fourth coil 131. Further, the second coil 112 and the fifth coil 132 inserted in the same slot 355 are not directly connected to each other, so currents having different phases can be applied to the second coil 112 and the fifth coil 132. Further, the third coil 113 and the sixth coil 133 inserted in the same slot 355 are not directly connected to each other, so currents having different phases can be applied to the third coil 113 and the sixth coil 133. As a result, currents having different phases are applied to the coils 110 and 130 wound in the same slot 355, so the driving motor 100 can operate in the 2-distribution short-pitch winding mode. When a vehicle is driven in a driving mode requiring high power/high speed, the driving motor 100 can operate in the 2-distribution short-pitch winding mode.

For example, when the stage switch circuit 50 is turned off and the driving system 1 of a driving motor operates in the CEW mode, the first power conversion devices 121 and the third power conversion devices 141 can be turned on. In this case, the second power conversion devices 123 and the fourth power conversion devices 143 can be turned off. The first coil 111 and the fourth coil 131 inserted in the same slot 355 are connected to each other, so currents having the same phase can be applied to the first coil 111 and the fourth coil 131. Further, the second coil 112 and the fifth coil 132 inserted in the same slot 355 are directly connected to each other, so currents having the same phase can be applied to the second coil 112 and the fifth coil 132. Further, the third coil 113 and the sixth coil 133 inserted in the same slot 355 are directly connected to each other, so currents having the same phase can be applied to the third coil 113 and the sixth coil 133. As a result, currents having the same phase are applied to the coils wound in the same slot 355, so the driving motor 100 can operate in the 2-distribution short-pitch winding mode. When a vehicle is driven in a driving mode regarding fuel efficiency as important, the driving motor 100 can operate in the 2-distribution full-pitch winding mode.

When the winding pattern of the coils 110 and 130 is short-pitch winding with a vehicle driven in a fuel economy mode, the AC current that is applied to the coils 110 and 130 increases because the winding pattern of the short-pitch winding is lower in winding coefficient than the full-pitch winding, a copper loss may increase. There is a defect that as the cooper loss increases, the one-time driving distance (All Electric Range, AER) of a vehicle decreases. The copper loss is a loss caused by winding resistance of losses generated in electric devices. However, according to an embodiment of the present disclosure, the driving motor 100 may operate like the winding pattern of the coils 110 and 130 is full-pitch winding (operating in a 2-distribution full-pitch winding mode) when a vehicle is driven in a fuel economy mode, and may operate like the winding pattern of the coils 110 and 130 is short-pitch winding (operating in a 2-distribution short-pitch winding mode) when a vehicle is driven in high-power/high-speed mode. When the driving motor 100 operates in the 2-distribution short-pitch winding mode, the output of the driving motor 100 can be increased, and when the driving motor 100 operates in the 2-distribution full-pitch winding mode, a decrease of the efficiency of the driving motor 100 can be prevented. The driving system 1 of a driving motor according to an embodiment of the present disclosure can change a mode into the 2-distribution short-pitch winding mode and the 2-distribution full-pitch winding mode, so it is possible to both improve the output of the driving motor 100 and maintain the efficiency of the driving motor in accordance with the driving mode of a vehicle.

Figure 4A:
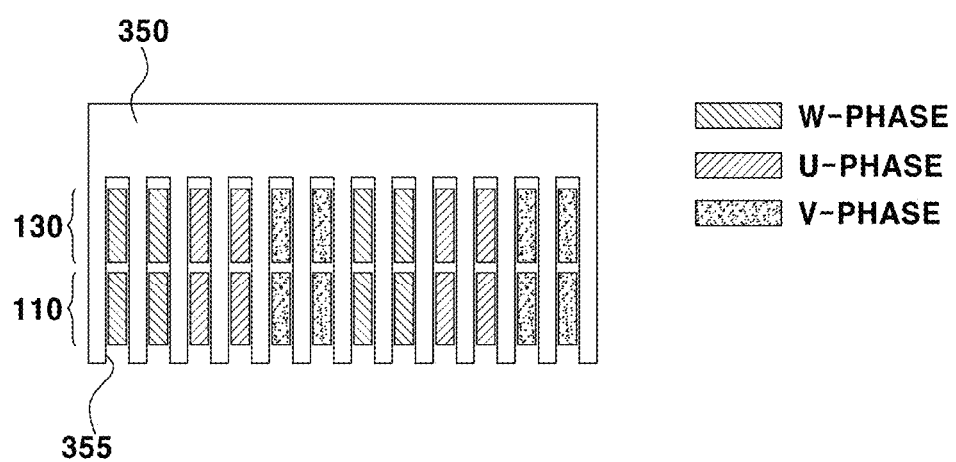
FIG. 4A is a diagram showing an AC phase of a current that is applied to a coil of a driving motor.
Figure 4B:
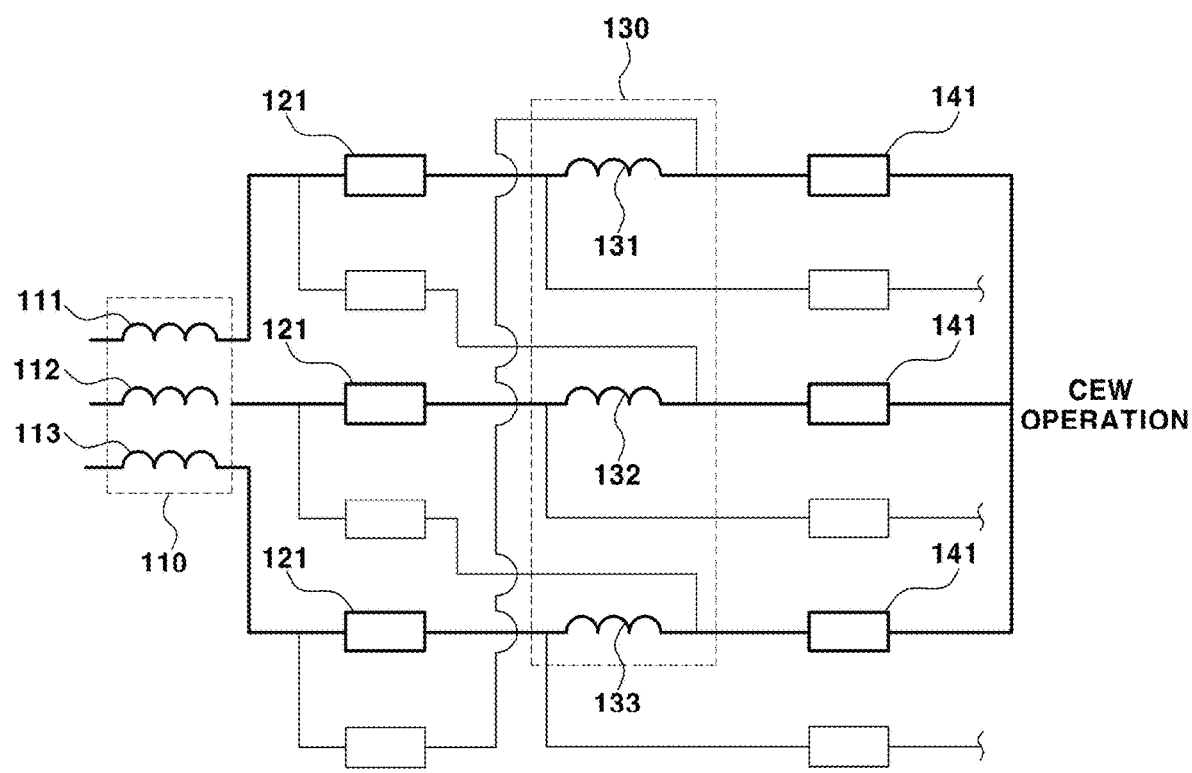
FIG. 4B is a diagram illustrating a circuit connection structure when a stage switch circuit according to an embodiment of the present disclosure is turned off.

FIG. 4A is a diagram showing an AC phase of a current that is applied to a coil of a driving motor, and FIG. 4B is another diagram illustrating a circuit connection structure when a stage switch circuit according to an embodiment of the present disclosure is turned off.

Referring to FIGS. 2 and 4A-4B, the stage switch circuit 50 is turned off and the driving motor 100 can be operated in the CEW mode. In this case, the first power conversion devices 121 and the third power conversion devices 141 are turned on, so the first and fourth coils 111 and 131, the second and fifth coils 112 and 132, and the third and sixth coils 113 and 133 may be directly connected to each other, respectively. Accordingly, currents having the same phase can be applied to the first coil 111 and the fourth coil 131 wound in the same slot 355, currents having the same phase can be applied to the second coil 112 and 132 wound in the same slot 355, and currents having the same phase can be applied to the third coil 113 and the sixth coil 133 wound in the same slot 355. As a result, the winding pattern of the coils 110 and 130 may be 2-distribution full-pitch winding.

Figure 5A:
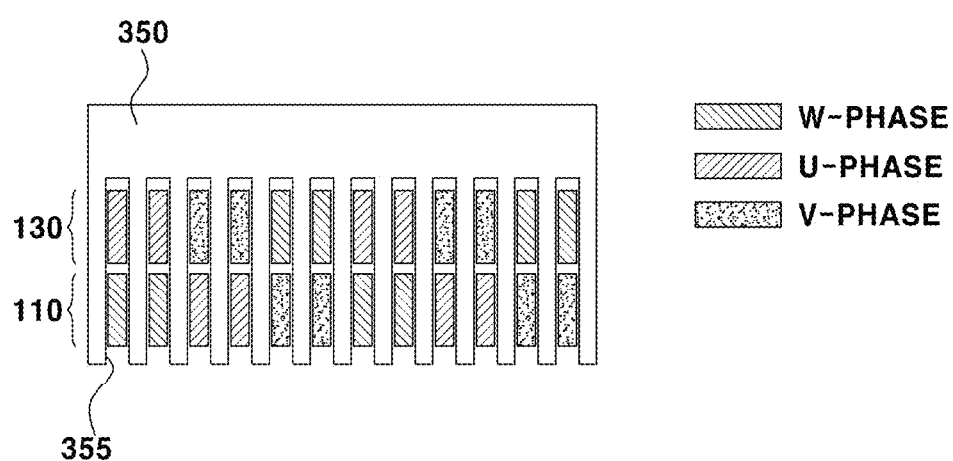
FIG. 5A is a diagram showing an AC phase of a current that is applied to a coil of a driving motor.
Figure 5B:
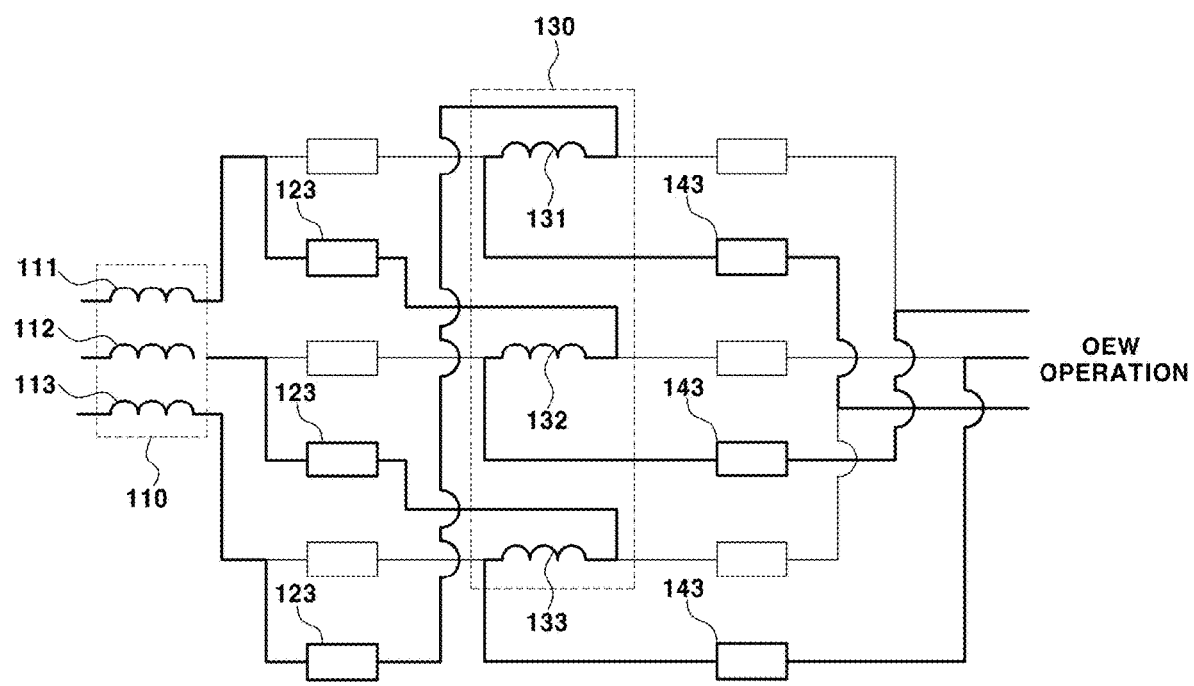

FIG. 5A is a diagram showing an AC phase of a current that is applied to a coil of a driving motor, and FIG. 5B is a diagram illustrating a circuit connection structure when a stage switch circuit according to an embodiment of the present disclosure is turned on.

Referring to FIGS. 2 and 5A-5B, the stage switch circuit 50 is turned on and the driving motor 100 can be operated in the OEW mode. In this case, the second power conversion devices 123 and the fourth power conversion devices 143 are turned on, so the first coil 111 and the fifth coil 132 can be directly connected to each other, the second coil 112 and the sixth coil 133 can be directly connected to each other, and the third coil 113 and the fourth coil 131 can be directly connected to each other. However, unlike those shown in the figures, the first coil 111 may be directly connected to the sixth coil 133, the second coil 112 may be directly connected to the fourth coil 131, and the third coil 113 may be directly connected to the fifth coil 132. The first coil 111 and the fourth coil 131 may be wound at the same slot 355, the second coil 112 and the fifth coil 132 may be wound at the same slot 355, and the third coil 113 and the sixth coil 133 may be wound at the same slot 355. Accordingly, currents having two different AC phases can be applied to the coils 110 and 130 wound at the same slot 355. In other words, currents having the same phase can be applied to the first coil 111 and the sixth coil 133, currents having the same phase can be applied to the second coil 112 and the fourth coil 131, and currents having the same phase can be applied to the third coil 113 and the fifth coil 132. As a result, the winding pattern of the coils 110 and 130 may be 2-distribution short-pitch winding.

According to an embodiment of the present disclosure, two adjacent slots can be defined as a pair of slots, and coils 110 and 130 to which currents having two AC phases can be wound at the pair of slots. However, the pair of slots may include three or more adjacent slots. Two coils 110 and 130 to which the same AC phase is continuously applied in the transverse direction of the slots 355 in 2-distribution, which may mean that two slots 355 are defined as a pair of slots and coils 110 and 130 to which currents having different AC phases are applied are wound at each pair of slots.

In adjacent pairs of slots 355, the same AC phase can be applied to the second coil set 130 wound inside any one pair of slots 355 and the first coil set 110 wound outside another pair of slots 355. In the figures, the upper portion may be defined as the inside of the slots and the lower portion may be defined as the outside of the slot. The second coil set 130 may be defined as a fundamental part and the first coil part 110 may be defined as a short-pitch part. The fundamental part and the short-pitch part mean coils to which AC current is applied, so the fundamental part and the short-pitch part may be a phase difference by 60 degrees.

In another form, the first coil set 110 wound at any one pair of slots 355 may be defined as a fundamental part and the second coil set 130 wound at a slot adjacent to the any one pair of slots 355 may be defined as a short-pitch part.

A second coil set 130 to which a U-phase current is applied may be wound inside a first slot and a second slot of a first electrode, and a first coil set 110 to which a W-phase current is applied may be wound outside the first slot and the second slot of the first electrode. For example, currents having different AC phases can be applied to two coils 110 and 130 disposed in one slot. In this case, a first coil set 110 to which a U-phase current is applied, which is the same as a side of the first slot and the second slot of the first electrode, may be wound outside a third slot and a fourth slot of the first electrode. Further, a coil to which a V-phase current is applied may be wound inside the third slot and the fourth slot of the first electrode, and a coil to which a V-phase current is applied may be wound outside a fifth slot and a sixth slot of the first electrode. This pattern may be applied in the same way to all of the eight electrodes of the driving motor 100.

A plurality of coils 110 and 130 to which currents having different AC phases may be wound at each of slots 355 defined in the stator core 350. A plurality of coils 110 and 130 to which currents having the same phase are applied may be arranged to have a difference of 60 degrees in electrical angle. As a result, currents having different AC phases are applied to the coils 110 and 130 wound at each of the slots 355, so the driving motor 100 can be driven in a short-pitch winding mode. Accordingly, since the coils 110 and 130 to which currents having the same AC phase are applied are arranged to have a difference of 60 degrees in electrical angle, harmonic waves that may be generated by the coils 110 and 130 can be offset.

According to an embodiment of the present disclosure, when a vehicle is driven in a high-power/high-speed mode, the driving motor 100 is driven in the short-pitch winding mode, so the output of the driving motor 100 can be improved.

Figure 6:
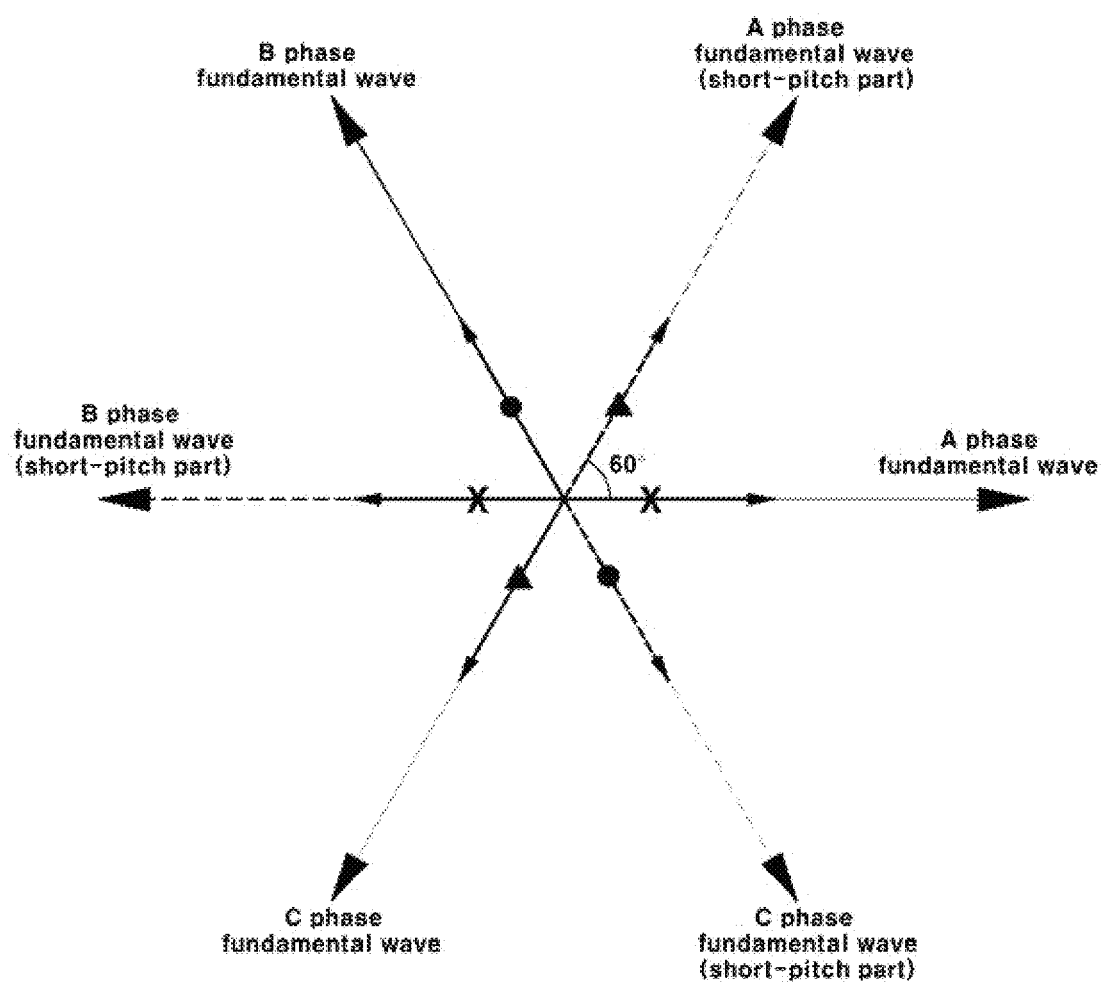
FIG. 6 is a diagram illustrating offsetting of harmonic waves according to an exemplary embodiment of the present disclosure.

FIG. 6 is a diagram illustrating offsetting of harmonic waves according to an exemplary embodiment of the present disclosure.

Referring to FIGS. 2, 5A-5B, and 6, when the driving motor 100 is driven in the short-pitch mode, each of currents of three phases may generate a third harmonic wave. In detail, the currents of three waves may mean an A-phase fundamental wave, a B-phase fundamental wave, and a C-phase fundamental wave, and a third harmonic wave may be generated at each of the A-phase fundamental wave, B-phase fundamental wave, and C-phase fundamental wave.

The power of the battery 10 can be applied to a Y connection of the driving motor in a motor driving system (1-stage) that uses only one inverter of the related art. Three harmonic waves that are generated by three phase currents through control between lines have the same magnitude and phase in the Y connection. Accordingly, three phase harmonic waves are offset. However, the power of the battery 10 can be applied to each phase of the driving motor 100 in a motor driving system (2-stage) that uses only one inverter of the present disclosure. Accordingly, a motor driving system can be designed to have high performance and high efficiency, but there is a defect that the third harmonic waves generated from currents of three phases are not fundamentally offset. If third harmonic waves are not offset, heat dissipation and efficiency of the driving motor may be decreased. Further, when a harmonic wave exists, there may be a problem that noise (NVH), vibration, and harshness of a driving motor are increased.

According to an embodiment of the present disclosure, there are a fundamental wave that is generated from the fundamental part of the coils 110 and 130 and a short wave generated from the short-pitch part of the coils 110 and 130, and a third harmonic wave may be generated from each of the fundamental wave and the short wave. Since the fundamental wave and the short wave may have a phase difference of 60 degrees, the harmonic wave generated from the fundamental wave and the harmonic wave generated from the short wave may also have a phase difference of 60 degrees. However, according to an embodiment of the present disclosure, since the harmonic wave generated from the fundamental wave and the harmonic wave generated from the short wave may also have a phase difference of 60 degrees, the harmonic waves can be offset. Accordingly, it is possible to solve the problem that the NVH of the driving motor 100 increases and the efficiency of the driving motor 100 decreases.

Although exemplary embodiments of the present disclosure were described above with reference to the accompanying drawings, those having ordinary skill in the art would understand that the present disclosure may be implemented in various ways without changing the necessary features or the spirit of the prevent disclosure. Therefore, the embodiments described above are only examples and should not be construed as being limitative in all respects.

What is claimed is:

1. A driving system of a driving motor, comprising:
  a driving motor including a stator having slots at which coils, to which currents of three phases are applied, are wound;
  a first inverter connected to first ends of the coils of the stator;
  a second inverter connected to second ends of the coils of the stator; and
  a stage switch circuit configured to control an electrical connection between the second ends of the coils of the stator and the second inverter,
  wherein the coils include a first coil set connected to an output terminal of the first inverter and a second coil set connected to an input terminal of the second inverter, and
  currents having the same phase or currents having different AC phases are applied to the first coil set and the second coil set wound at the slots by controlling on and off of the stage switch circuit,
  wherein the stage switch circuit is connected to the second coil set and the second inverter, and
  wherein the first coil set and the second coil set are wound at each of the slots.

2. The driving system of claim 1, wherein when the stage switch circuit is turned off, the currents having the same phase are applied to the first coil set and the second coil set wound at the slots.

3. The driving system of claim 1, wherein when the stage switch circuit is turned on, the currents having different AC phases are applied to the first coil set and the second coil set wound at the slots.

4. The driving system of claim 3, wherein:
  two or three slots which are adjacent each other are defined as a pair of slots,
  the second coil set of the pair of slots is defined as fundamental part, and
  the first coil set of another pair of slots which is adjacent to the pair of slots is defined as a short-pitch part of the fundamental part.

5. The driving system of claim 4, wherein:
  the currents having the same phase are applied to the fundamental part and the short-pitch part,
  the current applied to the short-pitch part has a phase difference by 60 degrees from the current that is applied to the fundamental part, and
  harmonic waves generated by the short-pitch part are offset with harmonic waves generated by the fundamental part.

6. The driving system of claim 1, wherein:
  first power conversion devices and second power conversion devices are provided between the first coil set and the second coil set, and third power conversion devices and fourth power conversion devices are provided between the second coil set and the second inverter.

7. The driving system of claim 6, wherein:
  the first power conversion devices and the second power conversion devices have different on and off time points, and
  the third power conversion devices and the fourth power conversion devices have different on and off time points.

8. The driving system of claim 7, wherein:
  a first end of the second coil set is connected to the first power conversion devices and the fourth power conversion devices, and
  a second end of the second coil set is connected to the second power conversion devices and the third power conversion devices.

9. The driving system of claim 8, wherein:
  when the stage switch circuit is turned off, the first power conversion devices and the third power conversion devices are turned on, the second power conversion devices and the fourth power conversion devices are turned off, and the first coil set and the second coil set are connected to each other by the first power conversion devices.

10. The driving system of claim 8, wherein:
  when the stage switch circuit is turned on, the first power conversion devices and the third power conversion devices are turned off, the second power conversion devices and the fourth power conversion devices are turned on, and the first coil set and the second coil set are connected to each other by the second power conversion devices.

11. The driving system of claim 10, wherein the first coil set and the second coil set are connected to each other by the fourth power conversion devices.

12. The driving system of claim 1, wherein the first coil set is disposed outside the slots and the second coil set is disposed inside the slots.

13. The driving system of claim 1, wherein 48 or 72 slots are provided for eight poles.

\* \* \* \* \*